United States Patent [19]

Gündner

[11] Patent Number: 4,644,145

[45] Date of Patent: Feb. 17, 1987

[54] OPTICAL RECEIVER WITH ELECTRICALLY VARIABLE ATTENUATOR

[75] Inventor: Hans M. Gündner, Benningen, Fed. Rep. of Germany

[73] Assignee: Standard Elektrik Lorenz Aktiengesellschaft, Stuttgart, Fed. Rep. of Germany

[21] Appl. No.: 728,999

[22] Filed: Apr. 30, 1985

[30] Foreign Application Priority Data

May 4, 1984 [DE] Fed. Rep. of Germany ....... 3416493

[51] Int. Cl.$^4$ .............................. G01J 1/20; H01J 5/16
[52] U.S. Cl. ..................................... 250/201; 250/227
[58] Field of Search ............... 250/200, 201, 206, 216, 250/229, 205, 214 AG, 214 C, 227; 350/96.11, 96.15, 96.2; 358/901; 365/215

[56] References Cited

U.S. PATENT DOCUMENTS

| 3,651,324 | 3/1972 | Carter et al. | 250/201 |
| 3,770,965 | 11/1973 | Edwards et al. | 250/201 |
| 3,982,124 | 9/1976 | Schoon | 250/201 X |
| 4,540,952 | 9/1985 | Williams | 330/279 |

FOREIGN PATENT DOCUMENTS 3233146 3/1983 Fed. Rep. of Germany .

Primary Examiner—Eugene R. LaRoche
Assistant Examiner—David Mis
Attorney, Agent, or Firm—John T. O'Halloran; Thomas F. Meagher

[57] ABSTRACT

An optical receiver which consists of an optical attenuator, an optical-to-electrical transducer, an amplifier, and an automatic level control circuit. The optical attenuator is an electrooptical modulator which is electrically controlled by the automatic level control circuit.

6 Claims, 5 Drawing Figures

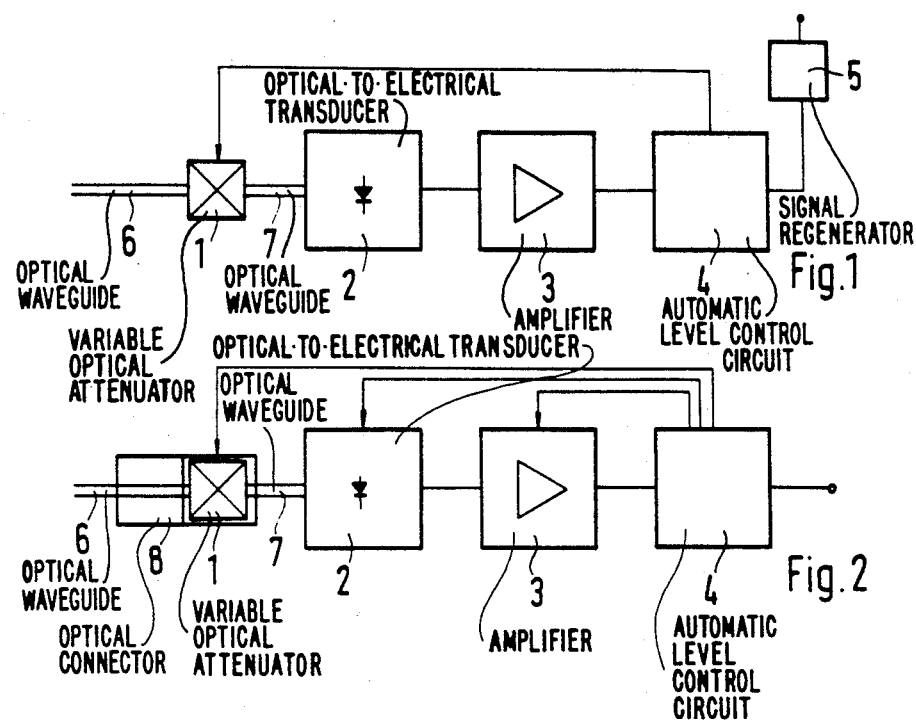
Fig.1
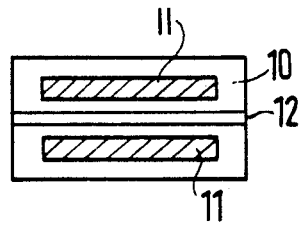
Fig.2
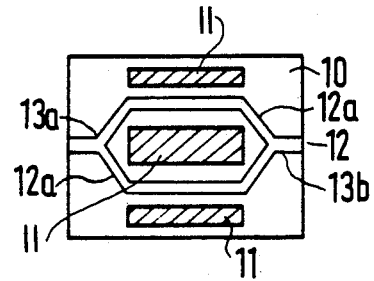
Fig.3a
Fig.3b
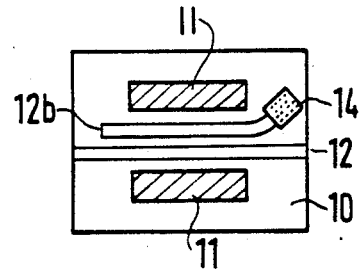
Fig.3c

OPTICAL RECEIVER WITH ELECTRICALLY VARIABLE ATTENUATOR

BACKGROUND OF THE INVENTION

The present invention relates to an optical receiver.

In conventional circuits, an optical-to-electrical transducer is followed by an automatic gain control amplifier which compensates for variations in the received light level and amplifies the latter to a level required by a following signal regenerator to restore the signal to its original form. Such an amplifier is disclosed in DE-OS No. 32 33 146. However, considerable difficulties are encountered in the design of the amplifier if both high sensitivity and a large control range are required. To be able to process high light levels, a variable optical attenuator to be mechanically adjusted to the respective attenuation value required is therefore placed ahead of the optical-to-electrical transducer. This, however, entails a considerable loss of sensitivity.

SUMMARY OF THE INVENTION

The object of the invention is to provide a receiver which combines high sensitivity with a large control range.

The advantage of the receiver according to the invention lies in the electric adjustment of the attenuation of the optical attenuator over such a large range that the gain of the amplifier need not be adjusted or needs to be adjusted only to a small extent, i.e., an extent which is easy to implement. This simplifies the circuit design, and instead of a transimpedance amplifier, for example, a high-impedance amplifier can be used with which a higher sensitivity is achieved in a manner known per se.

BRIEF DESCRIPTION OF THE DRAWINGS

FIG. 1 shows an embodiment of the receiver of the invention;

FIG. 2 shows a different embodiment of the receiver wherein the attenuator is incorporated in an optical connector; and FIG. 3 shows the basic structures of the modulators, namely:

FIG. 3a a first modulator,

FIG. 3b a Mach-Zehnder-type modulator, and

FIG. 3c a modulator constructed in the manner of a directional coupler.

The optical receiver will now be explained with reference to the accompanying FIGS. 1 and 2, which show embodiments of the receiver.

An optical signal arriving in a first optical waveguide 6 passes through an electrically variable optical attenuator 1 and is transmitted through a second optical waveguide 7 to an optical-to-electrical transducer 2, henceforth called "photodetector". The electric signal delivered by the photodetector 2 is amplified in an amplifier 3 and then fed to an automatic level control circuit 4. The latter, with the aid of a peak detector, produces an electric control voltage which adjusts the attenuator 1 so that at the input of a signal regenerator 5 following the level control circuit, a level is present which is sufficient for restoring the electric signal to its original form.

In FIG. 1, the optical waveguides 6 and 7 are single-mode fibers by which, in conjunction with a very small-area photodiode used as the photodetector 2, maximum sensitivity of the receiver is achieved.

In FIG. 2, the attenuator 1 is incorporated in an optical connector 8. The optical waveguide 7 is a short length of a multimode fiber which permits a simpler mechanical design than the single-mode fiber without any appreciable loss of sensitivity. The photodetector 2 is an avalanche photodiode whose avalanche multiplication is varied by an electric voltage from the automatic level control circuit 4. The gain of the amplifier 3 is variable in the same manner.

The optical attenuator 1 is implemented, for example, with one of the electrooptical modulators described in the following. Such modulators are known per se (R. Hunsperger: "Integrated Optics: Theory and Technology", Springer-Verlag, 1982).

The modulators are formed on substrates 10 of LiNbO$_3$, for example. Each of the substrates 10 contains at least two electrodes 11 and at least one optical waveguide 12 located between the electrodes 11. When a voltage of a few volts is applied to the electrodes 11, a change is produced in the optical properties of the material of the optical waveguides due to the electrooptical (Pockels) effect.

In the electrooptical modulator of FIG. 3a, the optical waveguide 12 is designed to transmit no light at a first electric potential $V_1$ while transmitting the light freely in the fundamental mode at a second electric potential $V_2$. The attenuation of the lightwaves is continuously variable in the range between $V_1$ and $V_2$.

In another embodiment, the substrate is made of a semiconductor material, such as GaAs. To change the optical properties, the Franz-Keldysh effect is used.

FIG. 3b shows a Mach-Zehnder-type modulator. In the area of the three electrodes 11, the optical waveguide 12 branches into two waveguides 12a each located between two electrodes, so that the incoming light is split into two subwaves at a point 13a. By applying suitable potentials, a phase shift of up to 180° is adjustable between the subwaves propagating in the two optical waveguides 12a. The attenuation of the lightwaves results from the interference of the two subwaves where the waveguides 12a meet again, i.e., at the point 13b.

The modulator of FIG. 3c works on the principle of a directional coupler. In addition to the optical waveguide 12 going through the modulator, an optical waveguide 12b with an absorber 14 at at least one of its end is located between the electrodes 11. By applying suitable potentials to the electrodes 11, the phase velocities of the light in the optical waveguides 12, 12b can be adjusted so that the light arriving in the optical waveguide 12 either remains there or is coupled, in whole or in part, to the optical waveguide 12b and absorbed in the absorber 14.

I claim:

1. Optical receiver consisting of an optical attenuator (1), an optical-to-electrical transducer (2), an amplifier (3), and an automatic level control circuit (4), for controlling the level of a signal provided from said amplifier characterized in that the attenuation introduced by the optical attenuator (1) is electrically variable by an electronic control voltage provided to said optical attenuator from said automatic level control circuit which includes a peak detector for producing said electronic control voltage.

2. An optical receiver as claimed in claim 1, characterized in that the optical attenuator (1) is the control element of an automatic control system the other elements of which are the optical-to-electrical transducer (2), the amplifier (3), and the automatic level control circuit (4).

3. An optical receiver as claimed in claim 2, characterized in that, in addition to the optical attenuator (1), either the optical-to-electrical transducer (2) or the amplifier (3) (or both) is (are) the control element of the automatic control system, and that an electronic control voltage provided to said transducer and said amplifier are produced in the automatic level control circuit (4).

4. An optical receiver as claimed in claim 1 characterized in that the optical attenuator (1) is a semiconductor-base or $LiNbO_3$-base electrooptical modulator.

5. An optical receiver as claimed in claim 1 characterized in that the optical attenuator (1) is incorporated in an optical connector.

6. An optical receiver as claimed in claim 1 characterized in that the optical attenuator (1), the optical-to-electrical transducer (2), the amplifier (3), and the automatic level control circuit (4) are integrated on a single chip.

* * * * *